US009835739B2

(12) United States Patent
Zhang et al.

(10) Patent No.: US 9,835,739 B2
(45) Date of Patent: Dec. 5, 2017

(54) METHOD AND APPARATUS FOR PROCESSING SIGNALS OF SEMICONDUCTOR DETECTOR

(71) Applicants: TSINGHUA UNIVERSITY, Beijing (CN); NUCTECH COMPANY LIMITED, Beijing (CN)

(72) Inventors: Lan Zhang, Beijing (CN); Yulan Li, Beijing (CN); Yuanjing Li, Beijing (CN); Jianqiang Fu, Beijing (CN); Yingshuai Du, Beijing (CN); Wei Zhang, Beijing (CN); Xuming Ma, Beijing (CN); Jun Li, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 14/800,635

(22) Filed: Jul. 15, 2015

(65) Prior Publication Data
US 2016/0018537 A1 Jan. 21, 2016

(30) Foreign Application Priority Data
Jul. 15, 2014 (CN) .......................... 2014 1 0336256

(51) Int. Cl.
*G01T 1/24* (2006.01)
*H04N 5/32* (2006.01)

(52) U.S. Cl.
CPC .............. *G01T 1/247* (2013.01); *G01T 1/241* (2013.01); *H04N 5/32* (2013.01)

(58) Field of Classification Search
CPC ............ G01T 1/247; G01T 1/241; H04N 5/32
USPC ..................................... 250/370.13
See application file for complete search history.

(56) References Cited

U.S. PATENT DOCUMENTS

| | | | |
|---|---|---|---|
| 6,175,120 B1* | 1/2001 | McGregor ................ | G01T 1/24 250/370.06 |
| 7,378,663 B2* | 5/2008 | Gros D'Aillon ......... | G01T 1/17 250/370.1 |
| 8,269,180 B2* | 9/2012 | De Geronimo ......... | G01T 1/247 250/370.01 |
| 2005/0067572 A1* | 3/2005 | Amemiya ............. | G01T 1/2985 250/363.05 |

(Continued)

*Primary Examiner* — Taeho Jo
(74) *Attorney, Agent, or Firm* — McDermott Will & Emery LLP

(57) ABSTRACT

The present invention provides a method and apparatus for processing signals of a semiconductor detector, including: acquiring a relationship of a time difference between anode and cathode signals of the semiconductor detector with an anode signal amplitude; obtaining an optimal data screening interval according to the relationship of the time difference between anode and cathode signals of the semiconductor detector with the anode signal amplitude, wherein the optimal data screening interval is an interval where the time difference between the anode and cathode signals is greater than 50 ns; and screening and processing the collected data according to the optimal data screening interval when the semiconductor detector collects data. The present invention better overcomes the inherent crystal defects of the detector, reduces the effect of background noise, increases the energy resolution of the cadmium zinc telluride detector under room temperature, and improves the peak-to-compton ratio.

8 Claims, 9 Drawing Sheets

(56) References Cited

U.S. PATENT DOCUMENTS

| | | | |
|---|---|---|---|
| 2005/0139775 A1* | 6/2005 | Gono | G01T 1/242 250/370.09 |
| 2008/0042070 A1* | 2/2008 | Levin | H04N 5/32 250/370.13 |
| 2009/0114831 A1 | 5/2009 | Spartiotis et al. | |
| 2009/0224167 A1* | 9/2009 | Blevis | G01T 1/241 250/370.13 |
| 2010/0051818 A1* | 3/2010 | De Geronimo | G01T 1/247 250/370.01 |
| 2010/0078558 A1 | 4/2010 | Prokesch et al. | |
| 2010/0176303 A1* | 7/2010 | Motomura | G01T 1/242 250/370.09 |
| 2012/0313196 A1* | 12/2012 | Li | H01L 27/1446 257/429 |
| 2013/0126746 A1* | 5/2013 | Bolotnikov | G01T 1/241 250/370.13 |
| 2013/0134317 A1* | 5/2013 | Fauler | G01T 1/241 250/371 |
| 2014/0217297 A1* | 8/2014 | Bolotnikov | G01T 1/2928 250/370.13 |
| 2014/0231657 A1* | 8/2014 | Bolotnikov | G01T 1/17 250/370.06 |

\* cited by examiner

Acquiring values of respective time differences and respective amplitude ratios of a signal of the field-enhanced electrode to cathode and anode signals of a field-enhanced semiconductor detector, and the relationships of the values of the respective time differences and respective amplitude ratios of the field-enhanced semiconductor detector with the anode signal amplitude ⸺ 301

↓

Obtaining an optimal data screening interval according to values of respective time differences and respective amplitude ratios of the signal of the field-enhanced electrode to the cathode and anode signals of the field-enhanced semiconductor detector, and the relationships of the values of the respective time differences and the respective amplitude ratios of the field-enhanced semiconductor detector with the anode signal amplitude ⸺ 302

↓

When the field-enhanced semiconductor detector collects data, screening and processing the collected data according to the optimal data screening interval ⸺ 303

Fig. 3

Acquiring at least two of the following data: the relationship of the time difference between anode and cathode signals of a field-enhanced semiconductor detector with anode signal amplitude, the relationship of an amplitude ratio between cathode and anode signals with the anode signal amplitude, the values of respective time differences and respective amplitude ratios of a signal of a field-enhanced electrode to the cathode and anode signals of the field-enhanced semiconductor detector, and the relationships of the values of the respective time differences and the respective amplitude ratios of the field-enhanced semiconductor detector with the anode signal amplitude ⸺ 401

↓

Obtaining an optimal data screening interval according to at least two of the following data: the relationship of the time difference between the anode and cathode signals of the field-enhanced semiconductor detector with the anode signal amplitude, the relationship of an amplitude ratio between cathode and anode signals with the anode signal amplitude, the values of respective time differences and respective amplitude ratios of the signal of the field-enhanced electrode to the cathode and anode signals of the field-enhanced semiconductor detector, and the relationships of the values of the respective time differences and the respective amplitude ratios of the field-enhanced semiconductor detector with the anode signal amplitude ⸺ 402

↓

When the field-enhanced semiconductor detector collects data, screening and processing the collected data according to the optimal data screening interval ⸺ 403

Fig. 4

METHOD AND APPARATUS FOR PROCESSING SIGNALS OF SEMICONDUCTOR DETECTOR

FIELD OF THE INVENTION

The present invention relates to the technical field of detecting nuclear radiation, and more particularly to a method and apparatus for processing signals of a semiconductor detector.

BACKGROUND OF THE INVENTION

The Cadmium zinc telluride (CdZnTe) detector is a high-performance semiconductor radiation detector at room temperature (RTD) developed recently. The CdZnTe crystal is characterized of high resistivity (about $10^{11}$ Ωcm), a large atomic number, a wide bandgap (the bandgap varied continually from 1.4 eV to 2.26 eV), so that a detector manufactured from which has small leakage current, an excellent energy resolution for X and γ rays at room temperature, an energy detection range of 10 keV-4 MeV and has no polarization phenomena, and thus can be applied to various kinds of detectors and spectrometers in fields of astronomy, medical science, industry, military affairs, safety inspection and the like.

As compared with other semiconductors, such as a high purity germanium (HPGe), CdZnTe has a wider bandgap, a larger impendence, a lower intrinsic carrier density, and has smaller dark current when a bias voltage is applied onto two terminals thereof, thus being a semiconductor detector capable of operating under room temperature. Also as compared with a scintillator detector, the CdZnTe detector has a high energy resolution which is much better than that of a sodium iodide (NaI) detector, and the CdZnTe has no polarization effect, the signals detected by the detector are converted directly, and thus the detector is liable to combine with front-end electronics. A nuclear radiation detector made of CdZnTe has a small size, being portable and can operate under room temperature.

However, the performance of the CdZnTe detector is hindered due to certain defects existed in the CdZnTe crystal. In principle the μτ value of carriers in the CdZnTe crystal is lower and at the order of $10^{-5}$, and the mobility difference is significant between electrons and holes; the carrier lifetime of the crystal is shorter, and the trapping of charges, especially of holes are severe during carrier transportation. The relatively low drift velocity of holes results in a phenomenon of relatively long low-energy tail when the detector detects the ray spectrum, which has certain adverse effect on the counting rate and the spectral resolution. Viewed from the existing manufacture of CdZnTe, the CdZnTe crystal is characterized of a smaller size in crystal growth and non-uniformity of crystal, as well as structural defects. The inconsistency in this crystal will cause a resolution reduction of energy spectrum and a reduction of peak-to-compton ratio of a CdZnTe spectrometer, which adversely affects the identification of spectrum peak of low-energy elements.

Precisely because of the carrier trapping, non-uniformity and defects of the crystal, the output signal of the CdZnTe detector is associated with not only the deposited energy, but also the action location of the ray. The characteristic of spectral resolution is therefore decreased. Currently, the CdZnTe detector designed based on the sensitivity characteristic of single-polarity charge mainly includes: detectors of Parallel Frisch Grid type, Coplanar Frisch Grid type, Hemisphere type, CAPture type, Quasi-hemisphere type, mini-Pixelated type and the like. As restricted by the limitation of the crystal, the performance of the detector cannot be improved further. Especially for a field-enhanced CdZnTe semiconductor detector operating under room temperature and having high energy resolutions and high detection efficiency, in the prior art there is still lack of an efficient method for overcoming inherent crystal defects of the detector and improving the detecting performance further.

SUMMARY OF THE INVENTION (1) Technical Issue to be Solved

The present invention provides a method and apparatus for processing signals of a semiconductor detector to solve the technical problem in the prior art that the inherent crystal defects of the detector cannot be overcome, thereby improving the detecting performance.

(2) Technical Solutions

In order to solve the aforementioned technical issue, the present invention provides a method for processing signals of a semiconductor detector, including: acquiring a relationship of a time difference between anode and cathode signals with an anode signal amplitude of the semiconductor detector;

obtaining an optimal data screening interval according to the relationship of the time difference between the anode and cathode signals with the anode signal amplitude of the semiconductor detector, wherein the optimal data screening interval is an interval where the time difference between the anode and cathode signals is greater than 50 ns; and when the semiconductor detector collects data, screening and processing the collected data according to the optimal data screening interval.

Furthermore,

The step of acquiring the relationship of the time difference between the anode and cathode signals with the anode signal amplitude of the semiconductor detector includes: obtaining a time difference of the same event between anode and cathode signal peaks according to the data collected by the semiconductor detector, and depicting a two-dimensional image of the time differences among multiple signals versus the anode signal amplitude;

The step of obtaining the optimal data screening interval according to the relationship of the time difference between the anode and cathode signals with the anode signal amplitude of the semiconductor detector includes: analyzing the two-dimensional image to obtain the optimal data screening interval according to the distribution trend of the two-dimensional image; and The step of screening and processing the collected data according to the optimal data screening interval further includes: normalizing the anode signal amplitude according to a preset coefficient.

The present invention further provides a method for processing signals of a semiconductor detector, including:

acquiring a relationship of an amplitude ratio between cathode and anode signals with an anode signal amplitude of the semiconductor detector;

obtaining an optimal data screening interval according to the relationship of the amplitude ratio between cathode and anode signals with the anode signal amplitude of the semiconductor detector, wherein the optimal data screening interval is an interval where the amplitude ratio between cathode and anode signals is greater than 1.1/K, and the amplitude ratio is associated with a gain ratio K between cathode and anode circuits of the detector; and when the semiconductor detector collects data, screening and processing the collected data according to the optimal data screening interval.

Furthermore,

The step of acquiring the relationship of the amplitude ratio between cathode and anode signals with the anode signal amplitude of the semiconductor detector includes: obtaining amplitudes of the same event between the cathode and anode signals and the ratio of the amplitudes according to the data collected by the semiconductor detector, and depicting a two-dimensional image of the ratio versus the anode signal amplitude;

The step of obtaining the optimal data screening interval according to the relationship of the amplitude ratio between the cathode and anode signals with the anode signal amplitude of the semiconductor detector includes: analyzing the two-dimensional image to obtain the optimal data screening interval according to the distribution trend of the two-dimensional image; and The step of screening and processing the collected data according to the optimal data screening interval further includes: normalizing the anode signal amplitude according to a preset coefficient.

The present invention yet further provides a method for processing signals of a semiconductor detector, including:

acquiring values of respective time differences and respective amplitude ratios of a signal of a field-enhanced electrode to cathode and anode signals of a field-enhanced semiconductor detector, and the relationships of the values of the respective time differences and the respective amplitude ratios of the field-enhanced semiconductor detector with the anode signal amplitude;

obtaining an optimal data screening interval according to the values of the respective time differences and the respective amplitude ratios of the signal of the field-enhanced electrode to the cathode and anode signals of the field-enhanced semiconductor detector, and the relationships of the values of the respective time differences and respective amplitude ratios of the field-enhanced semiconductor detector with the anode signal amplitude; and when the field-enhanced semiconductor detector collects data, screening and processing the collected data according to the optimal data screening interval.

The present invention still yet further provides a method for processing signals of a semiconductor detector, including:

acquiring at least two of the following data: the relationship of the time difference between anode and cathode signals of a field-enhanced semiconductor detector with an anode signal amplitude, the relationship of an amplitude ratio between cathode and anode signals with the anode signal amplitude, the values of respective time differences and respective amplitude ratios of a signal of a field-enhanced electrode to the cathode and anode signals of the field-enhanced semiconductor detector, and the relationships of the values of the respective time differences and the respective amplitude ratios of the field-enhanced semiconductor detector with the anode signal amplitude;

obtaining an optimal data screening interval according to at least two of the following data: the relationship of the time difference between the anode and cathode signals with the anode signal amplitude, the relationship of an amplitude ratio between cathode and anode signals with the anode signal amplitude of the field-enhanced semiconductor detector, the values of respective time differences and respective amplitude ratios of the signal of the field-enhanced electrode to the cathode and anode signals of the field-enhanced semiconductor detector, and the relationships of the values of the respective time differences and the respective amplitude ratios of the field-enhanced semiconductor detector with the anode signal amplitude; and when the field-enhanced semiconductor detector collects data, screening and processing the collected data according to the optimal data screening interval.

The present invention provides an apparatus for processing signals of a semiconductor detector, including a first acquiring unit, a first interval unit and a first screening unit which are connected sequentially, wherein:

The first acquiring unit is used for acquiring a relationship of a time difference between anode and cathode signals with an anode signal amplitude of the semiconductor detector;

The first interval unit is used for obtaining an optimal data screening interval according to the relationship of the time difference between the anode and cathode signals with the anode signal amplitude of the semiconductor detector, wherein the optimal data screening interval is an interval where the time difference between the anode and cathode signals is greater than 50 ns;

The first screening unit is used for screening and processing the collected data according to the optimal data screening interval when the semiconductor detector collects data.

Furthermore,

The first acquiring unit is also used for obtaining a time difference of the same event between anode and cathode signal peaks according to the data collected by the semiconductor detector, and depicting a two-dimensional image of the time differences among multiple signals versus the anode signal amplitude;

The first interval unit is also used for analyzing the two-dimensional image to obtain the optimal data screening interval according to the distribution trend of the two-dimensional image; and The first screening unit is also used for normalizing the anode signal amplitude according to a preset coefficient.

The present invention further provides an apparatus for processing signals of a semiconductor detector, including a second acquiring unit, a second interval unit and a second screening unit which are connected sequentially, wherein:

The second acquiring unit is used for acquiring a relationship of an amplitude ratio between cathode and anode signals with an anode signal amplitude of the semiconductor detector;

The second interval unit is used for obtaining an optimal data screening interval according to the relationship of the amplitude ratio between cathode and anode signals with the anode signal amplitude of the semiconductor detector, wherein the optimal data screening interval is an interval where the amplitude ratio between cathode and anode signals is greater than 1.1/K, and the amplitude ratio is associated with a gain ratio K between cathode and anode circuits of the detector; and The second screening unit is used for screening and processing the collected data according to the optimal data screening interval when the semiconductor detector collects data.

Furthermore,

The second acquiring unit is also used for acquiring the amplitudes of the same event between the cathode and anode signals and a ratio of the amplitudes according to the data collected by the semiconductor detector, and depicting a two-dimensional image of the ratio versus the anode signal amplitude;

The second interval unit is also used for analyzing the two-dimensional image to obtain the optimal data screening interval according to the distribution trend of the two-dimensional image; and The second screening unit is also used for normalizing the anode signal amplitude according to a preset coefficient.

The present invention yet further provides an apparatus for processing signals of a semiconductor detector, including a third acquiring unit, a third interval unit and a third screening unit which are connected sequentially, wherein:

The third acquiring unit is used for acquiring values of respective time differences and respective amplitude ratios of a signal of a field-enhanced electrode to cathode and anode signals of a field-enhanced semiconductor detector, and the relationships of the values of the respective time differences and the respective amplitude ratios of the field-enhanced semiconductor detector with the anode signal amplitude;

The third interval unit is used for obtaining an optimal data screening interval according to values of respective time differences and respective amplitude ratios of the signal of the field-enhanced electrode to the cathode and anode signals of the field-enhanced semiconductor detector, and the relationships of the values of the respective time differences and the respective amplitude ratios of the field-enhanced semiconductor detector with the anode signal amplitude; and The third screening unit is used for screening and processing the collected data according to the optimal data screening interval when the field-enhanced semiconductor detector collects data.

The present invention yet further provides an apparatus for processing signals of a semiconductor detector, including a fourth acquiring unit, a fourth interval unit and a fourth screening unit which are connected sequentially, wherein:

The fourth acquiring unit is used for acquiring at least two of the following data: the relationship of the time difference between anode and cathode signals of a field-enhanced semiconductor detector with an anode signal amplitude, the relationship of an amplitude ratio between cathode and anode signals with the anode signal amplitude, the values of respective time differences and respective amplitude ratios of a signal of a field-enhanced electrode to the cathode and anode signals of the field-enhanced semiconductor detector, and the relationships of the values of the respective time differences and the respective amplitude ratios of the field-enhanced semiconductor detector with the anode signal amplitude;

The fourth interval unit is used for obtaining an optimal data screening interval according to at least two of the following data: the relationship of the time difference between the anode and cathode signals of the field-enhanced semiconductor detector with the anode signal amplitude, the relationship of an amplitude ratio between cathode and anode signals with the anode signal amplitude, the values of respective time differences and respective amplitude ratios of the signal of the field-enhanced electrode to the cathode and anode signals of the field-enhanced semiconductor detector, and the relationships of the values of the respective time differences and the respective amplitude ratios of the field-enhanced semiconductor detector with the anode signal amplitude; and The fourth screening unit is used for screening and processing the collected data according to the optimal data screening interval when the field-enhanced semiconductor detector collects data.

(3) Advantageous Effect

It can be seen that in the present invention, information such as the amplitudes and time of the anode and cathode signals is obtained by respectively reading the anode and cathode signals by means of a field-enhanced cadmium zinc telluride (CdZnTe) detector, and is further combined with field-enhanced information and the like to select an appropriate matching solution according to the characteristics of the crystal, and thus the performance of the detecting system is improved. In the present invention no complicated change needs to be made to the readout electrode of the CdZnTe crystal and the electrode structure is simple; the data screening is conducted through algorithms and matching operations on the basis of not adding any hardware, and thus the matching method is convenient, such that the present invention can be well applied in a portable spectrometer, and improve the resolution and the like of the detector. Additionally, directed against the non-uniformity of the CdZnTe crystal and the inconsistency of field intensity in the crystal, in the present invention after the detector is manufactured, the resolution of the single-polarity sensitive detector can be effectively increased by fine regulating of matching parameters, and thus the present invention is characterized of portability and wildly application.

In the present invention, single matching and multiple matching are combined to find an applicable precise matching manner, which better overcomes the inherent crystal defects of the detector and reduces the effect of background noise, so that the energy resolution of the CdZnTe detector under room temperature is further increased and the peak-to-compton ratio is improved. The present invention also can be applied to other semiconductor detectors, such as Ge, CdTe, $HgI_2$, $PbI_2$, TiBr, GaAs and other semiconductors which have problems similar to the CdZnTe crystal, so as to increase the detecting resolution while improving the performance of the detector.

BRIEF DESCRIPTION OF THE DRAWINGS

For the purpose of illustrating the technical solutions of the embodiments of the present invention or the prior art more clearly, a brief description of the appending views used in the embodiments or the prior art is made as follows. It is apparent that the appending views described as follows are only some embodiments of the present invention, and other appending views can be obtained from these appending views by those of ordinary skills in the art without any creative work.

FIG. 3 is a schematic basic flow chart of a method for processing signals of a semiconductor detector according to an embodiment of the present invention;

FIG. 4 is a schematic basic flow chart of a method for processing signals of a semiconductor detector according to an embodiment of the present invention;

DETAILED DESCRIPTION OF THE EMBODIMENTS

For purpose of making the objects, technical solutions and advantages of the embodiments of the present embodiment more clearly, the technical solutions of the embodiments of the present invention are clearly and completely described in connection with the appending views of the embodiments of the present invention, and apparently the described embodiments are only some, instead of all embodiments of the present invention. All of other embodiments obtained by those of ordinary skills in the art based on the embodiments of the present invention without any creative work fall within the scope of protection of the present invention.

The relationship of cathode and anode signals of a semiconductor detector reflects the action location of a ray in the detector and the performance of the detector itself. An algorithm for matching cathode and anode signals can be obtained by analyzing the cathode and anode signals, thereby improving the efficiency of the detector.

Figure 1:
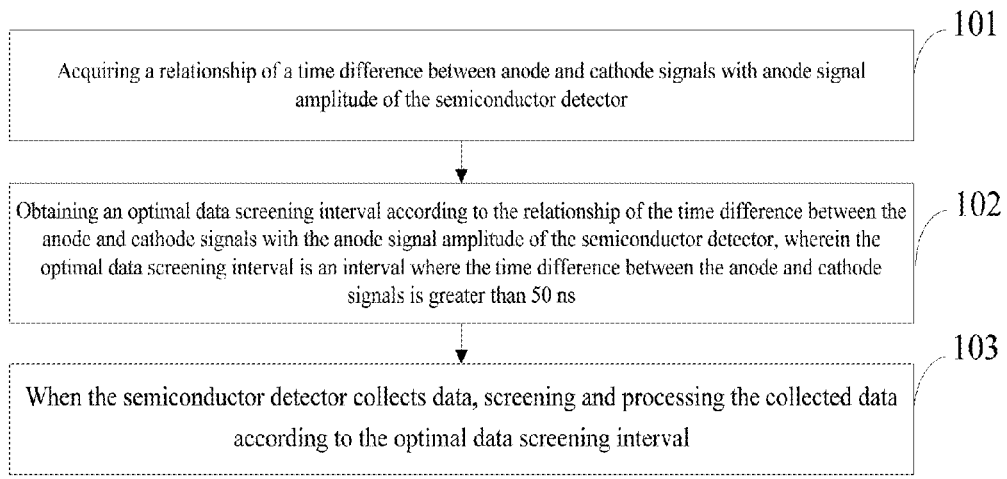
FIG. 1 is a schematic basic flow chart of a method for processing signals of a semiconductor detector according to an embodiment of the present invention.

An embodiment of the present invention first provides a method for processing signals of a semiconductor detector, as shown in FIG. 1 including:

Step 101: acquiring a relationship of a time difference between anode and cathode signals with anode signal amplitude of the semiconductor detector;

Step 102: obtaining an optimal data screening interval according to the relationship of the time difference between the anode and cathode signals with the anode signal amplitude of the semiconductor detector, wherein the optimal data screening interval is an interval where the time difference between the anode and cathode signals is greater than 50 ns; and Step 103: when the semiconductor detector collects data, screening and processing the collected data according to the optimal data screening interval.

Preferably, the step of acquiring the relationship of the time difference between the anode and cathode signals with the anode signal amplitude of the semiconductor detector includes: obtaining a time difference of the same event between anode and cathode signal peaks according to the data collected by the semiconductor detector, and depicting a two-dimensional image of the peak time differences among multiple signals versus the anode signal amplitude;

The time difference and distribution of signal amplitudes are varied due to different crystal structures and internal characteristics, and thus the step of obtaining the optimal data screening interval according to the relationship of the time difference between anode and cathode signals of the semiconductor detector with the anode signal amplitude can include: analyzing the two-dimensional image to obtain the optimal data screening interval according to the distribution trend of the two-dimensional image.

Preferably, the step of screening and processing the collected data according to the optimal data screening interval also includes: normalizing the anode signal amplitude to a preset coefficient, wherein the normalization method may be multiplying with a certain coefficient.

Figure 2:
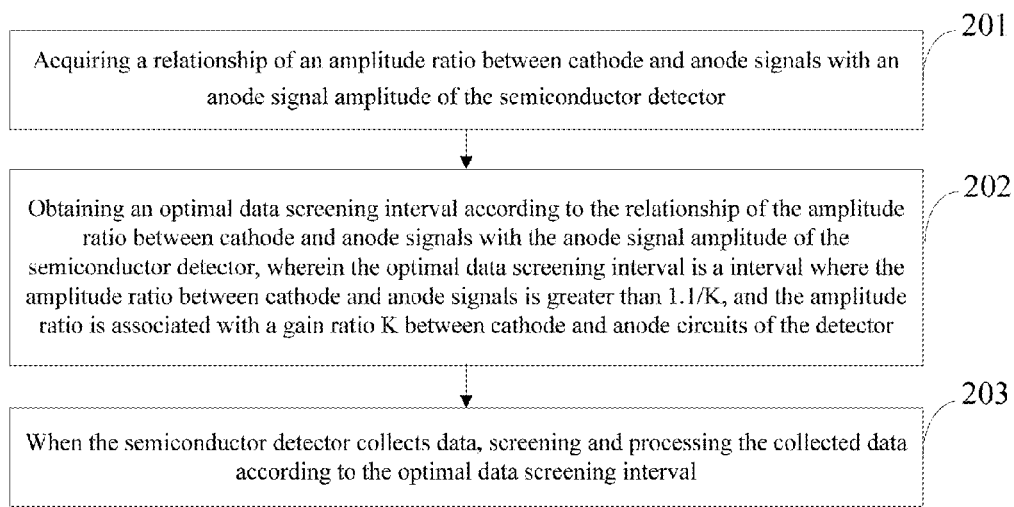
FIG. 2 is a schematic basic flow chart of a method for processing signals of a semiconductor detector according to an embodiment of the present invention.

An embodiment of the present invention also provides a method for processing signals of a semiconductor detector, as shown in FIG. 2 including:

Step 201: acquiring a relationship of an amplitude ratio between cathode and anode signals with anode signal amplitude of the semiconductor detector;

Step 202: obtaining an optimal data screening interval according to the relationship of the amplitude ratio between cathode and anode signals with the anode signal amplitude of the semiconductor detector, wherein the optimal data screening interval is an interval where the amplitude ratio between cathode and anode signals is greater than 1.1/K, and the amplitude ratio is associated with a gain ratio K between cathode and anode circuits of the detector; and Step 203: when the semiconductor detector collects data, screening and processing the collected data according to the optimal data screening interval.

Preferably the step of acquiring the relationship of the amplitude ratio between cathode and anode signals with the anode signal amplitude of the semiconductor detector includes: obtaining amplitudes of the same event between the cathode and anode signals and the ratio of the amplitudes according to the data collected by the semiconductor detector, and depicting a two-dimensional image of the ratio versus the anode signal amplitude; and The amplitude ratio and distribution of signal amplitudes are varied due to different structures and internal characteristics of the crystal, and thus the step of obtaining the optimal data screening interval according to the amplitude ratio between cathode and anode signals of the semiconductor detector includes: analyzing the two-dimensional image to obtain the optimal data screening interval according to the distribution trend of the two-dimensional image.

Preferably, the step of screening and processing the collected data according to the optimal data screening interval also includes: normalizing the anode signal amplitude to a preset coefficient, wherein the normalization method may be multiplying with a certain coefficient.

In a cadmium zinc telluride (CdZnTe) detector with a field-enhanced structure, multiple strips of field-enhanced electrodes on a sidewall also output signals and each carries information such as action time, energy and location between particles and the detector, and thus a matching manner suitable to the selected detector is determined via comparison and correlation analysis of a signal of a field-enhanced electrode and the cathode and anode signals of the detector, so as to screen the collected data, thereby improving performances such as the efficiency and the peak-to-compton ratio of the detecting system. Particularly, the relationship of a value of the time difference between signals of the field-enhanced electrode and the cathode of the field-enhanced semiconductor detector with the anode signal amplitude, the relationship of a value of the amplitude ratio between signals of the field-enhanced electrode and the cathode of the field-enhanced semiconductor detector with the anode signal amplitude, the relationship of a value of the time difference between signals of the field-enhanced electrode and the anode of the field-enhanced semiconductor detector with the anode signal amplitude, and the relationship of a value of the amplitude ratio between signals of the field-enhanced electrode and the anode with the anode signal amplitude are respectively obtained. Therefore, an embodiment of the present invention also provides a method for processing signals of a semiconductor detector, as shown in FIG. 3 including:

Step 301: acquiring values of respective time differences and respective amplitude ratios of a signal of the field-enhanced electrode to cathode and anode signals of a field-enhanced semiconductor detector, and the relationships of the values of the respective time differences and respective amplitude ratios of the field-enhanced semiconductor detector with the anode signal amplitude;

Step 302: obtaining an optimal data screening interval according to values of respective time differences and respective amplitude ratios of the signal of the field-enhanced electrode to the cathode and anode signals of the field-enhanced semiconductor detector, and the relationships of the values of the respective time differences and the respective amplitude ratios of the field-enhanced semiconductor detector with the anode signal amplitude; and Step 303: when the field-enhanced semiconductor detector collects data, screening and processing the collected data according to the optimal data screening interval.

The aforementioned time-matching method, amplitude-matching method and the method of matching the signal of the field-enhanced electrode all have their respective characteristics, and multiple-matching combines advantages of them to select an optimal multiple data screening condition.

An embodiment of the present invention also provides a method for processing signals of a semiconductor detector, as shown in FIG. 4 including:

Step 401: acquiring at least two of the following data: the relationship of the time difference between anode and cathode signals of a field-enhanced semiconductor detector with anode signal amplitude, the relationship of an amplitude ratio between cathode and anode signals with the anode signal amplitude, the values of respective time differences and respective amplitude ratios of a signal of a field-enhanced electrode to the cathode and anode signals of the field-enhanced semiconductor detector, and the relationships of the values of the respective time differences and the respective amplitude ratios of the field-enhanced semiconductor detector with the anode signal amplitude;

Step 402: obtaining an optimal data screening interval according to at least two of the following data: the relationship of the time difference between the anode and cathode signals of the field-enhanced semiconductor detector with the anode signal amplitude, the relationship of an amplitude ratio between cathode and anode signals with the anode signal amplitude, the values of respective time differences and respective amplitude ratios of the signal of the field-enhanced electrode to the cathode and anode signals of the field-enhanced semiconductor detector, and the relationships of the values of the respective time differences and the respective amplitude ratios of the field-enhanced semiconductor detector with the anode signal amplitude; and Step 403: when the field-enhanced semiconductor detector collects data, screening and processing the collected data according to the optimal data screening interval.

For the selected matching manner, it needs to determine whether the selected matching manner is appropriate according to multiple parameters. The parameters used for selecting include: peak count rate, peak-to-compton ratio, screening ratio of low-energy region, and resolution of total-energy peak.

Embodiment 1

A first embodiment of the present invention provides a method for processing signals of a CdZnTe detector by using a time difference between anode and cathode signals, which is capable of find a relationship of the time difference between anode and cathode signals with the anode signal amplitude by utilizing the drifting time difference between holes and electrons, so as to obtain a time-based data screening manner of the CdZnTe detector, thereby improving performances such as energy resolution and peak-to-compton ratio of the detector. The value of the time difference between anode and cathode signals is associated with the action location of the ray, the distribution characteristic of the internal electric field of the crystal. By using the time difference value to select the collected data, a best operation mode applicable to the selected crystal can be chosen to obtain an optimal energy resolution.

Figure 5:
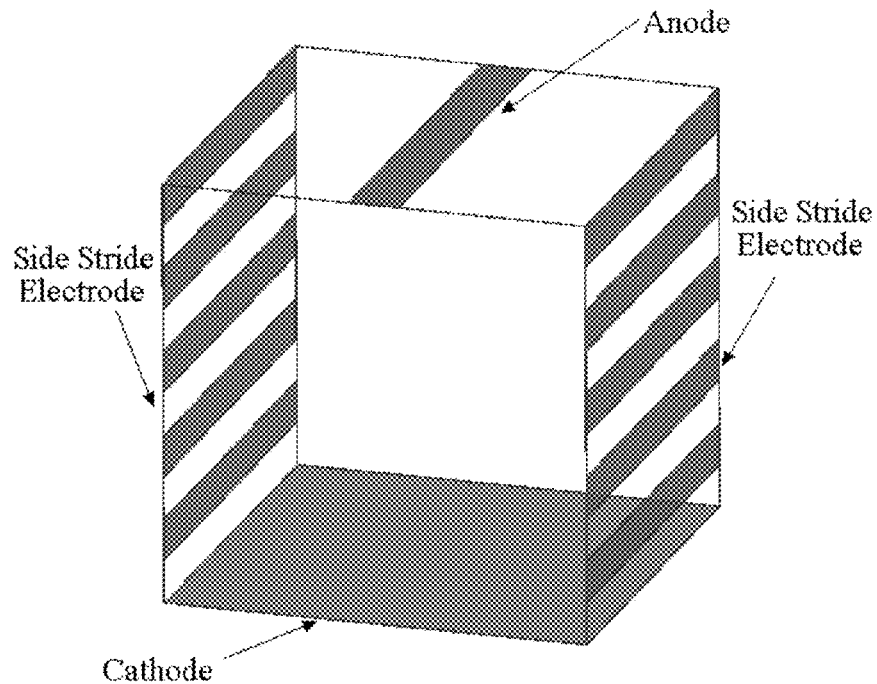
FIG. 5 is a schematic structural diagram of a cadmium zinc telluride detector of field-enhanced wire electrode adopted in the first embodiment and the second embodiment of the present invention.
Figure 6:
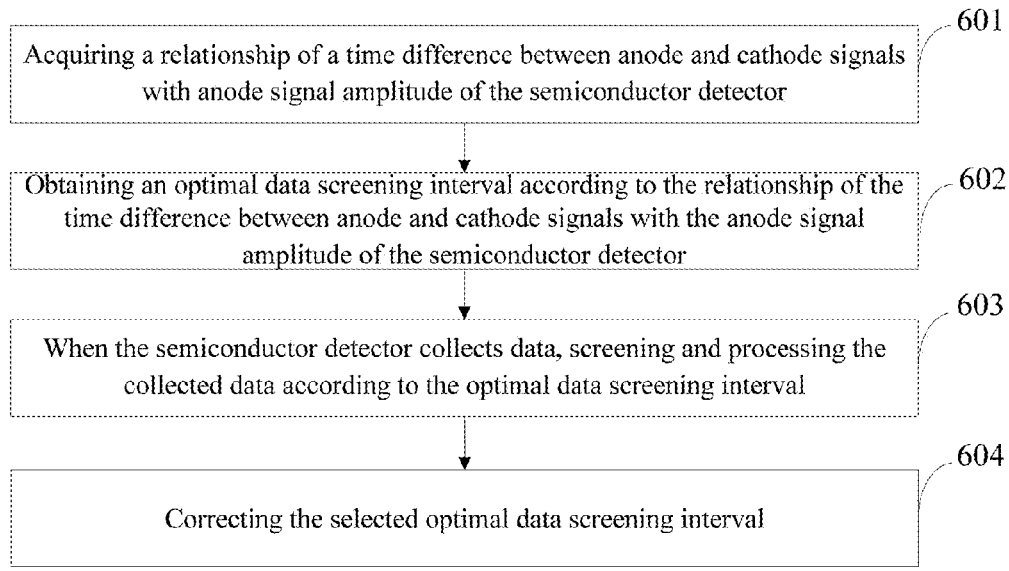
FIG. 6 is a schematic flow chart of a method for processing signals of a semiconductor detector according to the first embodiment of the present invention.
Figure 7:
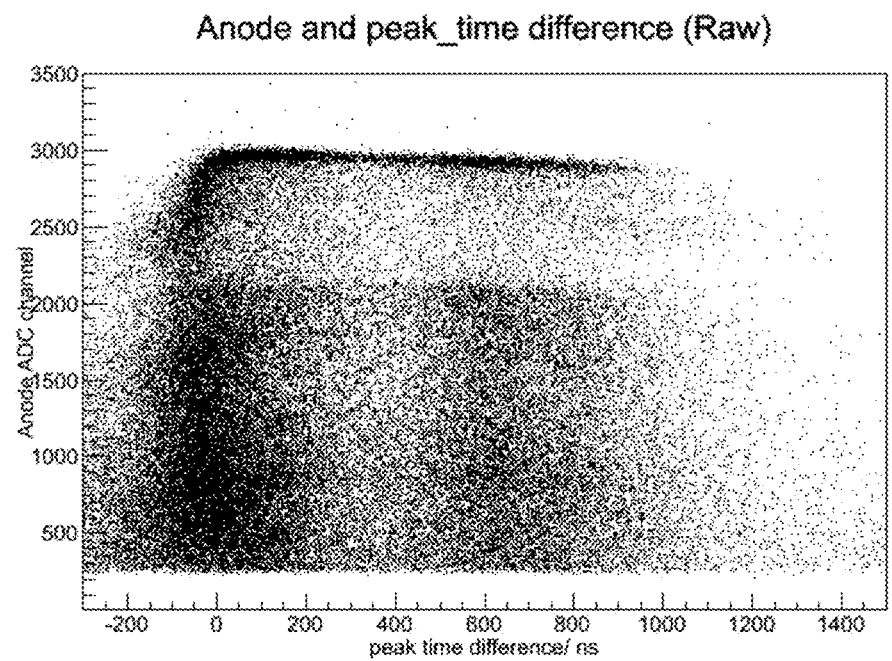
FIG. 7 is a two-dimensional distribution diagram of a peak time difference between anode and cathode signals versus an anode signal amplitude depicted according to the first embodiment of the present invention.

During selecting of the screening interval the detecting efficiency is also affected, and thus for achieving the application request of the spectrometer an appropriate data screening interval is selected. In this embodiment, a γ ray of 662 keV is adopted; the selected CdZnTe crystal is a cube with a size of $10 \times 10 \times 10$ mm$^3$; the number of side strip electrodes is 5, the width of the side electrode is 1 mm, and the electrode gap is 1 mm, as shown in the schematic structural diagram of FIG. 5; the anode and cathode signals of the crystal are respectively acquired by a data acquisition card through a charge sensitive amplifier circuit, a main amplify circuit and a filter shaping circuit. Referring to FIG. 6, the particular steps are:

Step 601: acquiring a relationship of a time difference between anode and cathode signals with anode signal amplitude of the semiconductor detector;

In this step, taking data at an operating voltage of 1220 V as an example, first the peak time difference of the same event between the anode and cathode signals is obtained according to the data collected by the semiconductor detector, and a two-dimensional image of the time differences among multiple signals versus the anode signal amplitude is depicted as FIG. 7.

Step 602: obtaining an optimal data screening interval according to the relationship of the time difference between anode and cathode signals with the anode signal amplitude of the semiconductor detector.

In this step, as seen in FIG. 7, events with the time difference below 50 ns are mainly events with the low-energy tail. Screening within a range can avoid lost of generality, so that in the embodiments of the present invention, events with the time difference between anode and cathode signals greater than 50 ns are selected to depict a two-dimensional image, so as to well eliminate the portions with the low-energy tail. Therefore, the optimal data screening interval is an interval where the time difference between anode and cathode signals is greater than 50 ns.

Step 603: when the semiconductor detector collects data, screening and processing the collected data according to the optimal data screening interval.

Figure 8:
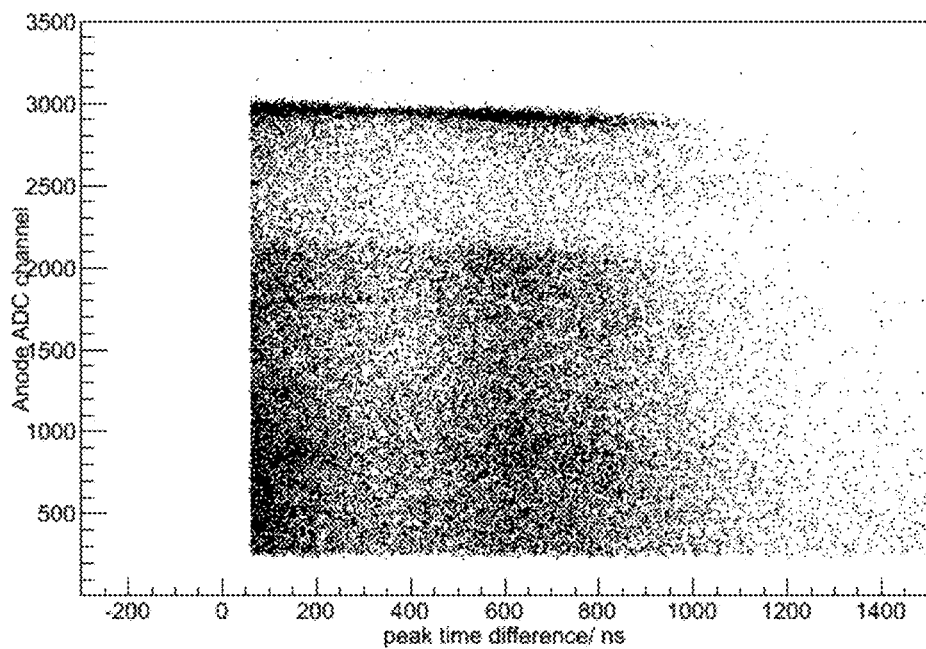
FIG. 8 is a schematic view of data screening results obtained by utilizing the optimal data interval according to the first embodiment of the present invention.
Figure 9:
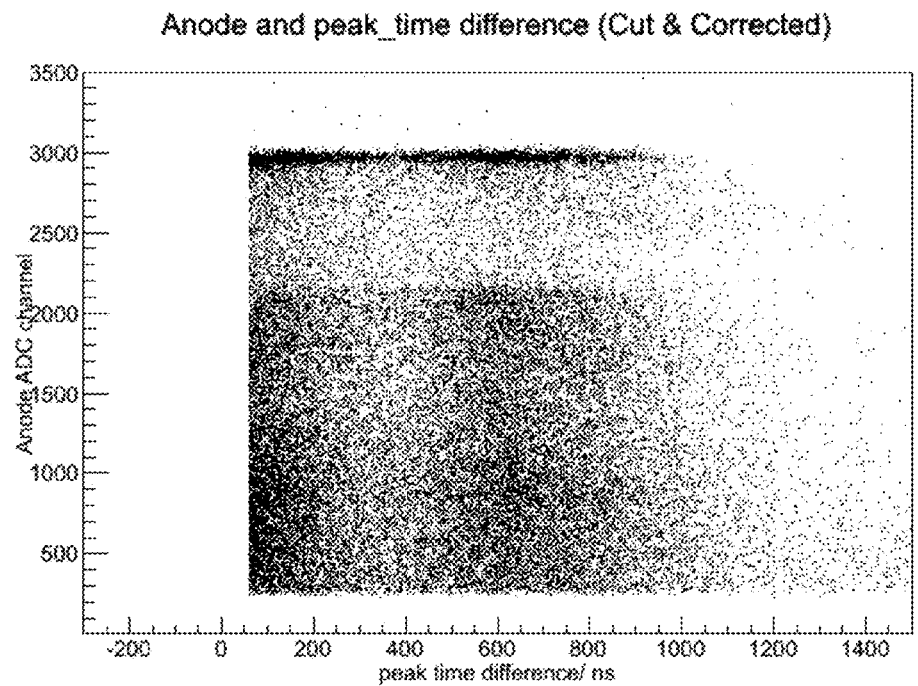
FIG. 9 is a schematic distribution view after the anode signal amplitude is normalized according to the first embodiment of the present invention.
Figure 10:
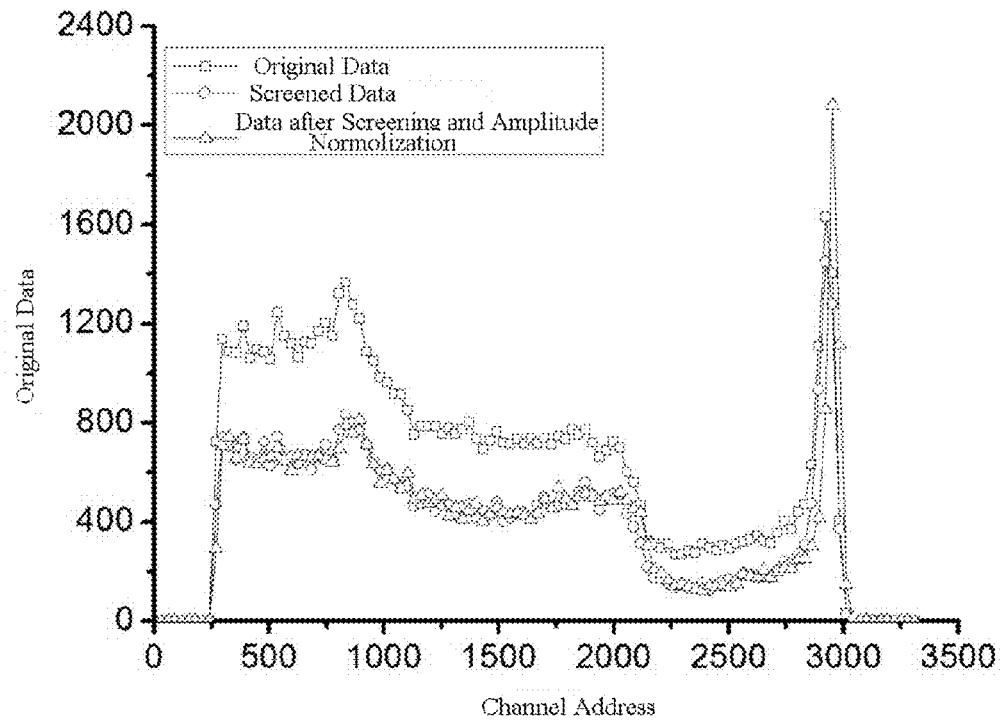
FIG. 10 is a spectrum comparison diagram after the time difference between cathode and anode signals is screened according to the first embodiment of the present invention.

In this step, the collected data are screened according to the optimal data screening interval with a time difference greater than 50 ns to depict FIG. 8. It can be seen from FIG. 8 that the anode signal amplitude is varied along with the time difference between the anode and cathode signals, which is deviated from the horizontal direction. Therefore normalization of the anode signal amplitude can be performed, and the normalization method may be multiplying with a certain coefficient, for example being normalized to 2960 channels, and the distribution after normalization is as shown in FIG. 9, and the energy spectrum comparison after screening is as shown in FIG. 10.

Step 604: correcting the selected optimal data screening interval.

In this step, the optimal data screening interval is corrected according to the obtained results, so as to gain a better technical effect.

In this embodiment, via a lot of experiment researches and comparative analyses, the optimal screening interval of 50 ns is determined based on the time difference between anode and cathode signals, wherein the results after screening are shown in table 1 below:

TABLE 1

Screening Results of the time difference between cathode and anode signals in embodiment 1

| Parameters | Detecting Efficiency/% | Area of Total-Energy Peak | Peak-to-compton ratio | Resolutions/% |
|---|---|---|---|---|
| Original Data | 100 | 100 | 2.2 | 3.2 |
| Screened Data | 52.8 | 77.1 | 3.45 | 2.87 |
| Data after Screening and Amplitude Normalization | 52.8 | 77.1 | 5.3 | 1.80 |

It can be seen that in this embodiment via the screening of the time difference between cathode and anode signals and the normalization of the anode signal amplitude, the total-energy peak can be retained to a great degree, the peak-to-compton ratio is increased by 1.41 times, and the resolution is increased by 1.40%. For a field-enhanced wire-electrode CdZnTe detector, as compared with no screening, this screening interval greatly improves performances of the detector, such as energy resolution and peak-to-compton ratio of the detector.

Embodiment 2

Figure 11:
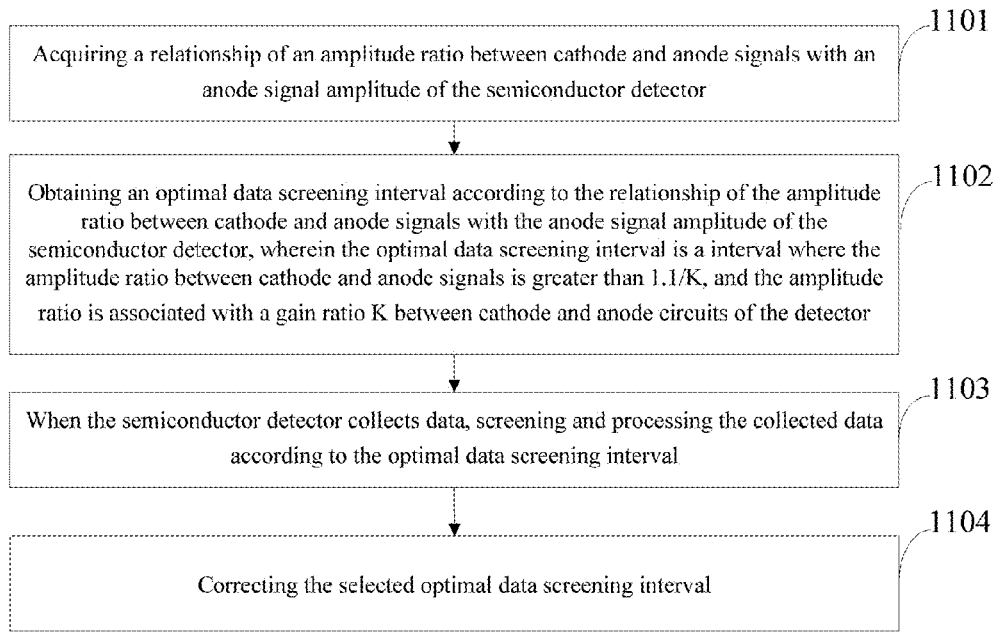
FIG. 11 is a schematic flow chart of a method for processing signals of a semiconductor detector according to the second embodiment of the present invention.
Figure 12:
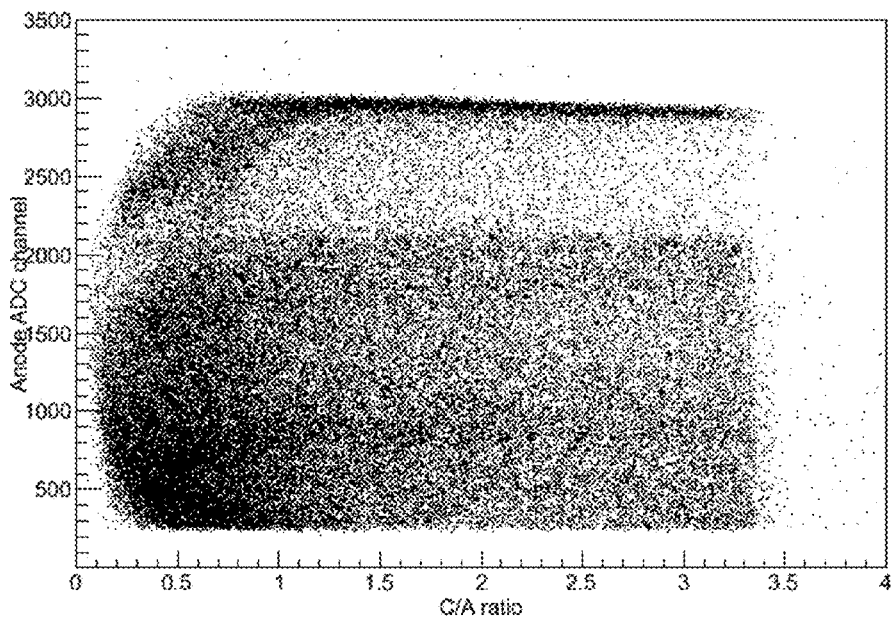
FIG. 12 is a two-dimensional distribution diagram of an amplitude ratio between cathode and anode signals versus anode signal amplitude depicted according to the second embodiment of the present invention.
Figure 13:
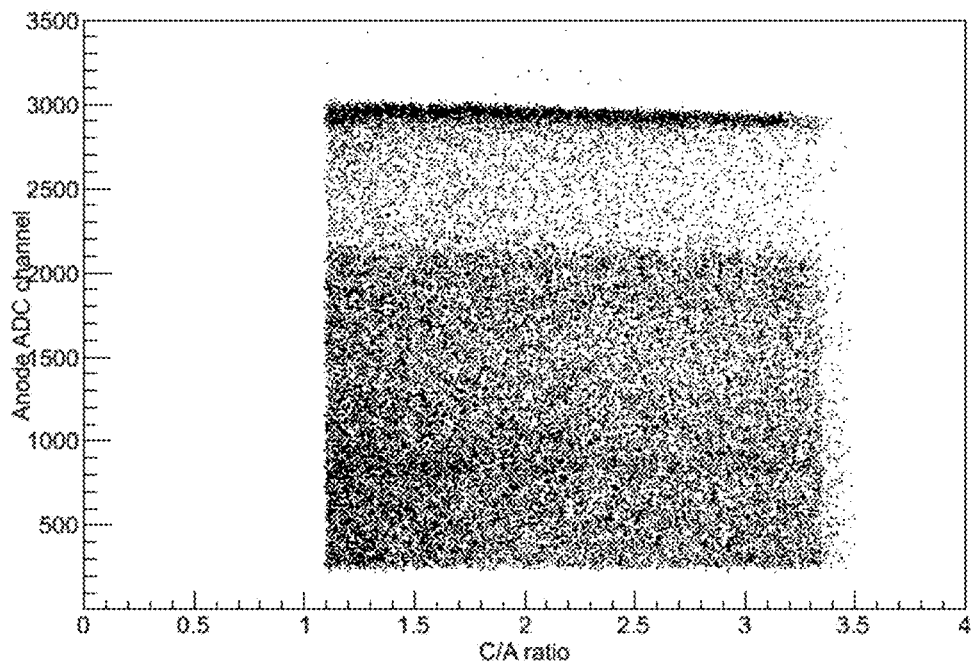
FIG. 13 is a schematic view of data screening results obtained by utilizing the optimal data interval according to the second embodiment of the present invention.
Figure 14:
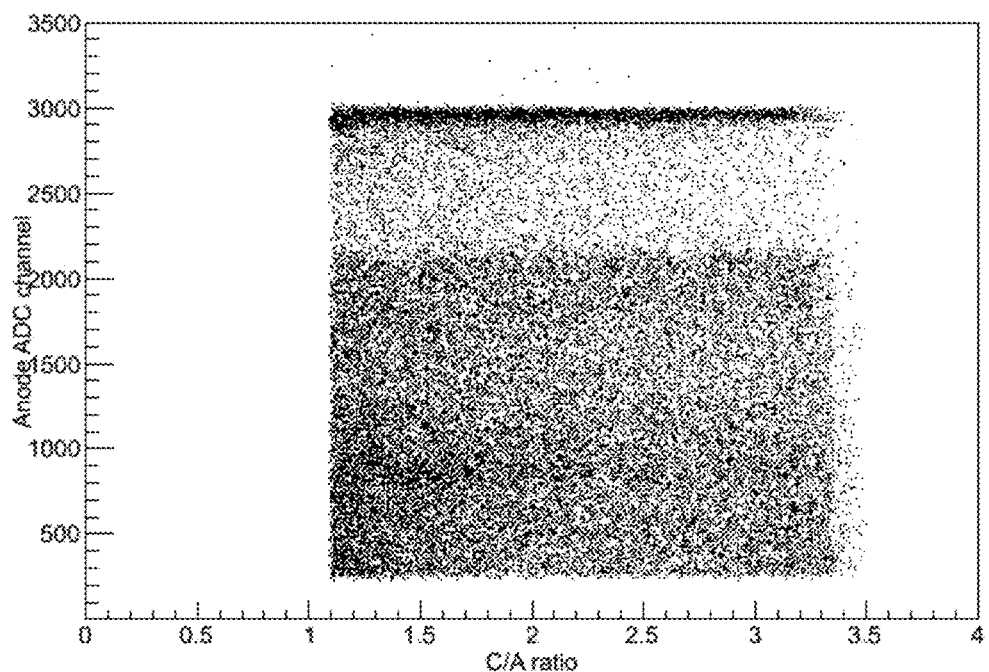
FIG. 14 is a schematic distribution view after the anode signal amplitude is normalized according to the second embodiment of the present invention.
Figure 15:
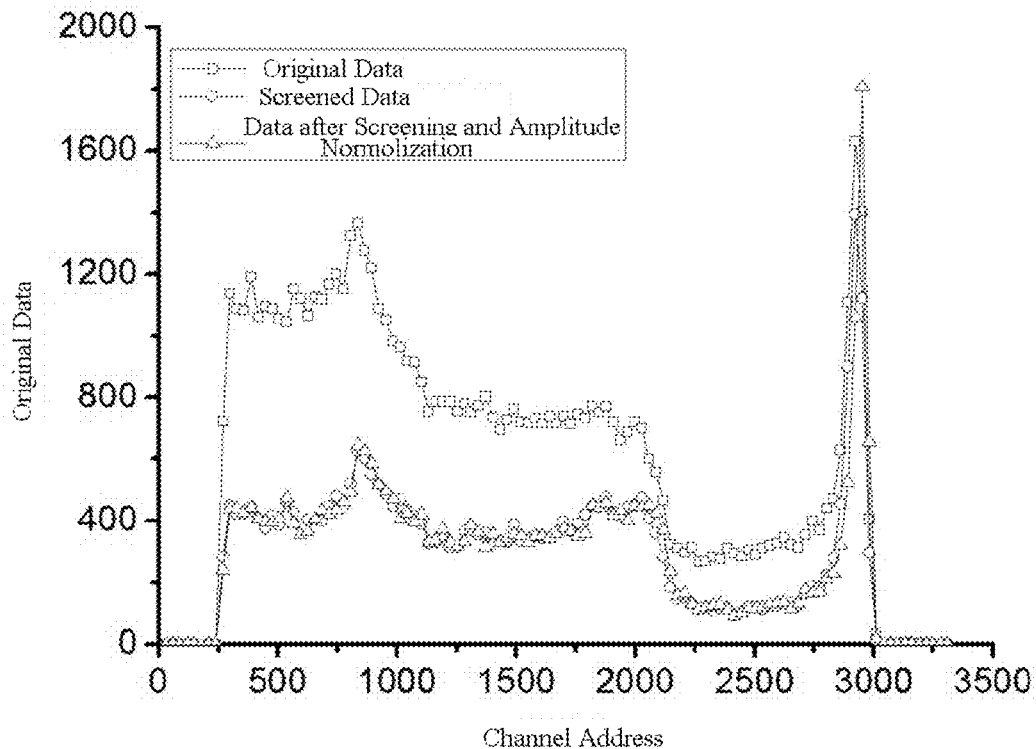
FIG. 15 is a spectrum comparison diagram after the amplitude ratio of the cathode and anode signals is screened according to the second embodiment of the present invention.

A second embodiment of the present invention provides a method for processing signals of the CdZnTe detector by utilizing an amplitude ratio between anode and cathode signals, wherein the amplitude ratio of the signals has a lot to do with the structures of the crystal and electrode of the detector, and also has a lot to do with the action location of particles on the crystal to a great degree. Due to inconsistency of internal structures of the crystal and variations of hole-trapping, the collected signals can be screened by determining the amplitude ratio interval of the used detector, so as to select an optimal operation mode for the detector. This embodiment also adopts the CdZnTe crystal shown in FIG. 5, and the particular steps are described as referring to FIG. 11:

Step 1101: acquiring a relationship of an amplitude ratio between cathode and anode signals with anode signal amplitude of the semiconductor detector;

In this step, taking data at the operation voltage of 1220 V as an example, first the amplitudes of the same event between the cathode and anode signals and the ratio of the amplitudes are obtained according to the data collected by the semiconductor detector, and a two-dimensional image of the amplitude ratio between cathode and anode signals versus the anode signal amplitude is depicted as FIG. 12;

Step 1102: obtaining an optimal data screening interval according to the relationship of the amplitude ratio between cathode and anode signals with the anode signal amplitude of the semiconductor detector, wherein the optimal data screening interval is an interval where the amplitude ratio between cathode and anode signals is greater than 1.1/K, and the amplitude ratio is associated with a gain ratio K between cathode and anode circuits of the detector;

In this step, as seen in FIG. 12, events with the amplitude ratio below 1.1 are mainly events with the low-energy tail. Screening within a range can avoid lost of generality, so that in the embodiments of the present invention, events with the amplitude ratio between cathode and anode signals greater than 1.1/K are selected to depict a two-dimensional image, so as to well eliminate the portions with the low-energy tail. Therefore, the optimal data screening interval is an interval where the amplitude ratio between cathode and anode signals is greater than 1.1/K. In embodiment 1, the value of the gain ratio K between the cathode and anode circuits of the detector is selected as 3.95; Furthermore, this K value is only the value of embodiment 1, without limiting K values selected in other embodiments of the present invention;

Step 1103: when the semiconductor detector collects data, screening and processing the collected data according to the optimal data screening interval;

In this step, the collected data are screened according to the optimal data screening interval with an amplitude ratio greater than 1.1/K to depict FIG. 13. It can be seen from FIG. 13 that the anode signal amplitude is varied along with the amplitude ratio between the cathode and anode signals, which is deviated from the horizontal direction. Therefore normalization of the anode signal amplitude can be performed, and the normalization method may be multiplying with a certain coefficient, for example being normalized to 2960 channels, and the distribution after normalization is as shown in FIG. 14, and the energy spectrum comparison after screening is as shown in FIG. 15.

Step 1104: correcting the selected optimal data screening interval; and

In this step, the optimal data screening interval is corrected according to the obtained results, so as to gain a better technical effect.

In this embodiment, via a lot of experiment researches and comparative analyses, the optimal screening interval is determined based on the amplitude ratio between cathode and anode signals, wherein the results after screening are shown in table 2 below:

TABLE 2

Screening Results of the amplitude ratio between cathode and anode signals in embodiment 2

| Parameters | Detecting Efficiency/% | Area of Total-Energy Peak | Peak-to-compton ratio | Resolutions % |
|---|---|---|---|---|
| Original Data | 100 | 100 | 2.2 | 3.2 |
| Screened Data | 46.4 | 76.7 | 3.5 | 2.87 |
| Data after Screening and Amplitude Normalization | 46.4 | 76.7 | 4.25 | 1.97 |

It can be seen that in this embodiment via the screening of the amplitude ratio between cathode and anode signals and the normalization of the anode signal amplitude, the total-energy peak can be retained to a great degree, the peak-to-compton ratio is increased by 0.932 times, and the resolution is increased by 1.23%. For a field-enhanced wire-electrode CdZnTe detector, as compared with no screening, this screening interval greatly improves performances of the detector, such as energy resolution and peak-to-compton ratio of the detector.

Embodiment 3

Figure 16:
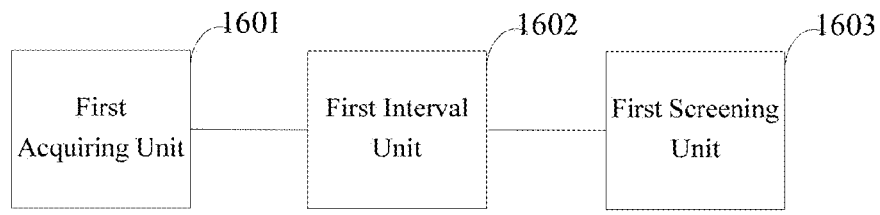
FIG. 16 is a schematic structural view of an apparatus for processing signals of the semiconductor detector according to the third embodiment of the present invention.

A third embodiment of the present invention provides an apparatus for processing signals of a semiconductor detector corresponding to the first embodiment of the present invention. Referring to FIG. 16, the apparatus includes a first acquiring unit 1601, a first interval unit 1602 and a first screening unit 1603 connected sequentially, wherein:

The first acquiring unit 1601 is used for acquiring a relationship of a time difference between anode and cathode signals with anode signal amplitude of the semiconductor detector;

The first interval unit 1602 is used for obtaining an optimal data screening interval according to the relationship of the time difference between the anode and cathode signals with the anode signal amplitude of the semiconductor detector, wherein the optimal data screening interval is an interval where the time difference between the anode and cathode signals is greater than 50 ns;

The first screening unit 1603 is used for screening and processing the collected data according to the optimal data screening interval when the semiconductor detector collects data.

Preferably, the first acquiring unit 1601 can also be used for: obtaining the peak time difference of the same event between anode and cathode signals according to the data collected by the semiconductor detector, and depicting a two-dimensional image of the time differences among multiple signals versus the anode signal amplitude; the first interval unit 1602 can also be used for analyzing the two-dimensional image to obtain the optimal data screening interval according to the distribution trend of the two-dimensional image; and the first screening unit 1603 can also be used for normalizing the anode signal amplitude according to a preset coefficient.

Embodiment 4

Figure 17:
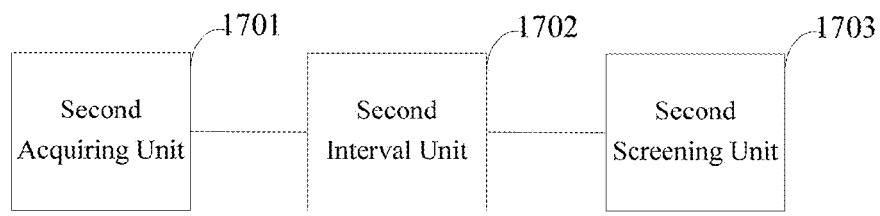
FIG. 17 is a schematic structural view of an apparatus for processing signals of the semiconductor detector according to the fourth embodiment of the present invention.

A fourth embodiment of the present invention provides an apparatus for processing signals of a semiconductor detector corresponding to the second embodiment of the present invention. Referring to FIG. 17, the apparatus includes a second acquiring unit 1701, a second interval unit 1702 and a second screening unit 1703 connected sequentially, wherein:

The second acquiring unit 1701 is used for acquiring a relationship of an amplitude ratio between cathode and anode signals with anode signal amplitude of the semiconductor detector;

The second interval unit 1702 is used for obtaining an optimal data screening interval according to the relationship of the amplitude ratio between cathode and anode signals with the anode signal amplitude of the semiconductor detector, wherein the optimal data screening interval is an interval where the amplitude ratio between cathode and anode signals is greater than 1.1/K, and the amplitude ratio is associated with a gain ratio K between cathode and anode circuits of the detector; and The second screening unit 1703 is used for screening and processing the collected data according to the optimal data screening interval when the semiconductor detector collects data.

Preferably, the second acquiring unit 1701 can also be used for: obtaining the amplitudes of the same event between cathode and anode signals and the ratio of the amplitudes according to the data collected by the semiconductor detector, and depicting a two-dimensional image of the amplitude ratio between cathode and anode signals versus the anode signal amplitude; the second interval unit 1702 can also be used for: analyzing the two-dimensional image to obtain the optimal data screening interval according to the distribution trend of the two-dimensional image; and the second screening unit 1703 can also be used for normalizing the anode signal amplitude according to a preset coefficient.

Embodiment 5

Figure 18:
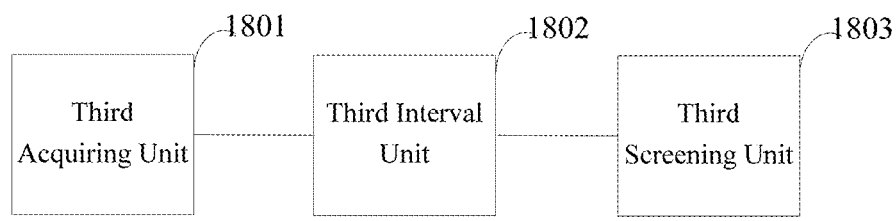
FIG. 18 is a schematic structural view of an apparatus for processing signals of the semiconductor detector according to the fifth embodiment of the present invention.

A fifth embodiment of the present invention provides an apparatus for processing signals of a semiconductor detector. Referring to FIG. 18, the apparatus includes a third acquiring unit 1801, a third interval unit 1802 and a third screening unit 1803 which are connected sequentially, wherein:

The third acquiring unit 1801 is used for acquiring values of respective time differences and respective amplitude ratios of a signal of a field-enhanced electrode to cathode and anode signals of a field-enhanced semiconductor detector, and the relationships of the values of the respective time differences and respective amplitude ratios of the field-enhanced semiconductor detector with the anode signal amplitude;

The third interval unit 1802 is used for obtaining an optimal data screening interval according to the values of the respective time differences and respective amplitude ratios of the signal of the field-enhanced electrode to the cathode and anode signals of the field-enhanced semiconductor detector, and the relationships of the values of the respective time differences and respective amplitude ratios of the field-enhanced semiconductor detector with the anode signal amplitude; and The third screening unit 1803 is used for screening and processing the collected data according to the optimal data screening interval when the field-enhanced semiconductor detector collects data.

Embodiment 6

Figure 19:
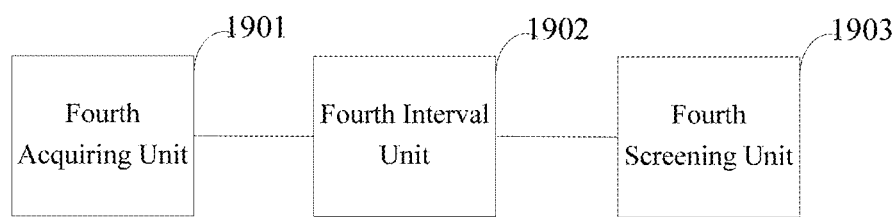
FIG. 19 is a schematic structural view of an apparatus for processing signals of the semiconductor detector according to the sixth embodiment of the present invention.

A sixth embodiment of the present invention provides an apparatus for processing signals of a semiconductor detector. Referring to FIG. 19, the apparatus includes a fourth acquiring unit 1901, a fourth interval unit 1902 and a fourth screening unit 1903 which are connected sequentially, wherein:

The fourth acquiring unit 1901 is used for acquiring at least two of the following data: the relationship of the time difference between anode and cathode signals of a field-enhanced semiconductor detector with anode signal amplitude, the relationship of an amplitude ratio between cathode and anode signals with the anode signal amplitude, the values of respective time differences and respective amplitude ratios of a signal of a field-enhanced electrode to the cathode and anode signals of the field-enhanced semiconductor detector, and the relationships of the values of the respective time differences and respective amplitude ratios of the field-enhanced semiconductor detector with the anode signal amplitude;

The fourth interval unit 1902 is used for obtaining an optimal data screening interval according to at least two of the following data: the relationship of the time difference between the anode and cathode signals of the field-enhanced semiconductor detector with the anode signal amplitude, the relationship of an amplitude ratio between cathode and anode signals with the anode signal amplitude, the values of respective time differences and respective amplitude ratios of the signal of the field-enhanced electrode to the cathode and anode signals of the field-enhanced semiconductor detector, and the relationships of the values of the respective time differences and the respective amplitude ratios of the field-enhanced semiconductor detector with the anode signal amplitude; and The fourth screening unit 1903 is used for screening and processing the collected data according to the optimal data screening interval when the field-enhanced semiconductor detector collects data.

The embodiments of the present invention can be applied in charge-readout detecting systems such as a semiconductor detector and a gas detector, which can screen the data through the characteristics of cathode and anode signals according to variations in interaction between particles and substances, detector materials and charge drifting.

It can be seen that the embodiments of the present invention at least has the following advantageous effects:

In the embodiments of the present invention, information such as the amplitudes and time of the anode and cathode signals is obtained by respectively reading the anode and cathode signals by means of a field-enhanced CdZnTe detector, and is further combined with field-enhanced information and the like to select an appropriate matching solution according to the characteristics of the crystal, and thus the performance of the detecting system is improved. In the embodiments of the present invention no complicated change needs to be made to the readout electrode of the CdZnTe crystal and the electrode structure is simple; the data screening is conducted through algorithms and matching operations on the basis of not adding any hardware, and thus the matching method is convenient, such that the present invention can be well applied in a portable spectrometer, and improve the resolution and the like of the detector. Additionally, directed against the non-uniformity of the CdZnTe crystal and the inconsistency of field intensity in the crystal, in the embodiments of the present invention after the detector is manufactured, the resolution of the single-polarity sensitive detector can be effectively increased by fine regulating of matching parameters, and thus the present invention is characterized of portability and wildly application.

In the embodiments of the present invention, single matching and multiple matching are combined to find an applicable precise matching manner, which better overcomes the inherent crystal defects of the detector and reduces the effect of background noise, so that the energy resolution of the CdZnTe detector under room temperature is further increased and the peak-to-compton ratio is improved. The embodiments of the present invention also can be applied to other semiconductor detectors, such as Ge, CdTe, $HgI_2$, $PbI_2$, TiBr, GaAs and other semiconductors which have problems similar to the CdZnTe crystal, so as to increase the detecting resolution while improving the performance of the detector.

Finally it should be noted that the aforesaid embodiments are only used for illustrating the technical solutions of the present invention, without any limiting; although the present invention is illustrated in details with reference to the aforesaid embodiments, those of ordinary skills in the art should understand that modifications still can be done to the technical solutions stated in the aforesaid embodiments, or equivalent replacements can be made to parts of technical characteristics of the solutions; and those modifications or replacements will not cause the nature of the corresponding technical solution to depart from the spirit and scope of the technical solutions descried in embodiments of the present invention.

What is claimed is:

1. A method for processing signals of a semiconductor detector, characterized in that the method comprises:
   acquiring a relationship of a time difference between anode and cathode signals with an anode signal amplitude of the semiconductor detector;
   obtaining an optimal data screening interval according to the relationship of the time difference between the anode and cathode signals with the anode signal amplitude of the semiconductor detector, wherein the optimal data screening interval is an interval where the time difference between the anode and cathode signals is greater than 50 ns; and
   when the semiconductor detector collects data, screening and processing the collected data according to the optimal data screening interval, and normalizing the anode signal amplitude according to a preset coefficient.

2. The method of claim 1, characterized in that:
   the step of acquiring the relationship of the time difference between the anode and cathode signals with the anode signal amplitude of the semiconductor detector comprises: obtaining a time difference of the same event between anode and cathode signal peaks according to the data collected by the semiconductor detector, and depicting a two-dimensional image of the time differences among multiple signals versus the anode signal amplitude; and the step of obtaining the optimal data screening interval according to the relationship of the time difference between the anode and cathode signals with the anode signal amplitude of the semiconductor detector comprises: analyzing the two-dimensional image to obtain the optimal data screening interval according to the distribution trend of the two-dimensional image.

3. A method for processing signals of a semiconductor detector, characterized in that the method comprises:

acquiring a relationship of an amplitude ratio between cathode and anode signals with an anode signal amplitude of the semiconductor detector;

obtaining an optimal data screening interval according to the relationship of the amplitude ratio between cathode and anode signals with the anode signal amplitude of the semiconductor detector, wherein the optimal data screening interval is an interval where the amplitude ratio between cathode and anode signals is greater than 1.1/K, and the amplitude ratio is associated with a gain ratio K between cathode and anode circuits of the detector; and when the semiconductor detector collects data, screening and processing the collected data according to the optimal data screening interval.

4. The method of claim 3, characterized in that:

the step of acquiring the relationship of the amplitude ratio between cathode and anode signals with the anode signal amplitude of the semiconductor detector comprises: obtaining amplitudes of the same event between the cathode and anode signals and the ratio of the amplitudes according to the data collected by the semiconductor detector, and depicting a two-dimensional image of the ratio versus the anode signal amplitude;

the step of obtaining the optimal data screening interval according to the relationship of the amplitude ratio between the cathode and anode signals with the anode signal amplitude of the semiconductor detector comprises: analyzing the two-dimensional image to obtain the optimal data screening interval according to the distribution trend of the two-dimensional image; and the step of screening and processing the collected data according to the optimal data screening interval further comprises: normalizing the anode signal amplitude according to a preset coefficient.

5. An apparatus for processing signals of a semiconductor detector, characterized in that the apparatus comprises an acquiring unit, an interval unit and a screening unit which are connected sequentially, wherein:

the acquiring unit is used for acquiring a relationship of a time difference between anode and cathode signals with an anode signal amplitude of the semiconductor detector;

the interval unit is used for obtaining an optimal data screening interval according to the relationship of the time difference between the anode and cathode signals with the anode signal amplitude of the semiconductor detector, wherein the optimal data screening interval is an interval where the time difference between the anode and cathode signals is greater than 50 ns; and the screening unit is used for screening and processing the collected data according to the optimal data screening interval when the semiconductor detector collects data, and normalizing the anode signal amplitude according to a preset coefficient.

6. The apparatus of claim 5, characterized in that:

the acquiring unit is also used for obtaining a time difference of the same event between anode and cathode signal peaks according to the data collected by the semiconductor detector, and depicting a two-dimensional image of the time differences among multiple signals versus the anode signal amplitude; and the interval unit is also used for analyzing the two-dimensional image to obtain the optimal data screening interval according to the distribution trend of the two-dimensional image.

7. An apparatus for processing signals of a semiconductor detector, characterized in that the apparatus comprises an acquiring unit, an interval unit and a screening unit which are connected sequentially, wherein:

the acquiring unit is used for acquiring a relationship of an amplitude ratio between cathode and anode signals with an anode signal amplitude of the semiconductor detector;

the interval unit is used for obtaining an optimal data screening interval according to the relationship of the amplitude ratio between cathode and anode signals with the anode signal amplitude of the semiconductor detector, wherein the optimal data screening interval is an interval where the amplitude ratio between cathode and anode signals is greater than 1.1/K, and the amplitude ratio is associated with a gain ratio K between cathode and anode circuits of the detector; and the screening unit is used for screening and processing the collected data according to the optimal data screening interval when the semiconductor detector collects data.

8. The apparatus of claim 7, characterized in that:

the acquiring unit is also used for acquiring the amplitudes of the same event between the cathode and anode signals and a ratio of the amplitudes according to the data collected by the semiconductor detector, and depicting a two-dimensional image of the ratio versus the anode signal amplitude;

the interval unit is also used for analyzing the two-dimensional image to obtain the optimal data screening interval according to the distribution trend of the two-dimensional image; and the screening unit is also used for normalizing the anode signal amplitude according to a preset coefficient.

* * * * *